United States Patent
Wittelsbürger et al.

(10) Patent No.: US 12,510,128 B2
(45) Date of Patent: Dec. 30, 2025

(54) DRIVE ARRANGEMENT FOR A FLAP OF A MOTOR VEHICLE

(71) Applicants: BROSE FAHRZEUGTEILE SE & CO. KOMMANDITGESELLSCHAFT, BAMBERG, Bamberg (DE); SUSPA GMBH, Altdorf (DE)

(72) Inventors: Michael Wittelsbürger, Bamberg (DE); Clemens Franke, Bamberg (DE); Sebastian Ramsauer, Fürth (DE); Patricia Cruz, Bamberg (DE); Roland Löscher, Erlangen (DE); Waldon Zuo, Jiangning District (CN)

(73) Assignees: BROSE FAHRZEUGTEILE SE & CO. KOMMANDITGESELLSCHAFT, BAMBERG (DE); SUSPA GMBH (DE)

( * ) Notice: Subject to any disclaimer, the term of this patent is extended or adjusted under 35 U.S.C. 154(b) by 246 days.

(21) Appl. No.: 18/017,212

(22) PCT Filed: Jul. 21, 2021

(86) PCT No.: PCT/EP2021/070431
§ 371 (c)(1),
(2) Date: Jan. 20, 2023

(87) PCT Pub. No.: WO2022/018157
PCT Pub. Date: Jan. 27, 2022

(65) Prior Publication Data
US 2023/0272657 A1     Aug. 31, 2023

(30) Foreign Application Priority Data
Jul. 21, 2020  (DE) ..................... 10 2020 119 230.4

(51) Int. Cl.
*F16F 9/02* (2006.01)
*E05F 3/12* (2006.01)
*F15B 13/042* (2006.01)

(52) U.S. Cl.
CPC .......... *F16F 9/0227* (2013.01); *F15B 13/042* (2013.01); *E05F 3/12* (2013.01);
(Continued)

(58) Field of Classification Search
CPC ...... F16F 9/0227; F16F 9/0245; F16F 9/0218; F16F 9/3214; F16F 9/3405; F16F 9/342;
(Continued)

(56) References Cited

U.S. PATENT DOCUMENTS 2,800,981 A * 7/1957 Fernand ................. F16F 9/516
 137/493
2,911,072 A * 11/1959 Schedl ................ F16F 9/3485
 188/315

(Continued)

FOREIGN PATENT DOCUMENTS

DE  545334 C  2/1932
DE  1149271 B  5/1963
(Continued)

OTHER PUBLICATIONS

Written Opinion for PCT/EP2021/070431, Mailing Date Oct. 19, 2021, English Translation attached to original, All together 17 Pages.
(Continued)

*Primary Examiner* — Thomas J Williams
(74) *Attorney, Agent, or Firm* — Dickinson Wright PLLC

(57) ABSTRACT

A drive arrangement for a motor vehicle flap including a gas pressure element, the gas pressure element has an outwardly sealed cylinder and a piston moveable in the cylinder interior along the cylinder axis and subdivides the cylinder
(Continued)

interior into two sub-chambers, the gas pressure element has a first drive connection connected to the cylinder, and a second drive connection connected to the piston, the cylinder filled with a fluid and the piston has an overflow channel arrangement to create a balancing flow between the two sub-chambers to balance a pressure drop between the two sub-chambers. The piston is assigned a switchable valve arrangement which, depending on the pressure drop between the two sub-chambers, to create different through-flow states differing the cross section of the overflow channel arrangement. Upon exceeding a predetermined threshold for the pressure drop, the valve arrangement switches to change the cross section of the overflow channel arrangement.

18 Claims, 4 Drawing Sheets

(52) U.S. Cl.
CPC ... *E05Y 2201/474* (2013.01); *E05Y 2201/478* (2013.01); *E05Y 2900/532* (2013.01); *E05Y 2900/546* (2013.01)

(58) Field of Classification Search
CPC . E05F 3/12; E05F 2201/474; E05F 2201/478; F15B 13/042
USPC ..... 188/280, 283, 282.8, 289; 267/120, 124, 267/127
See application file for complete search history.

(56) References Cited

U.S. PATENT DOCUMENTS

| | | | | |
|---|---|---|---|---|
| 3,568,711 A | * | 3/1971 | Katz | F16F 9/34 |
| | | | | 137/854 |
| 4,156,523 A | * | 5/1979 | Bauer | F16F 9/483 |
| | | | | 267/64.11 |
| 4,407,396 A | * | 10/1983 | Sirven | F16F 9/512 |
| | | | | 188/315 |
| 4,826,094 A | * | 5/1989 | Whiteley | F16F 9/516 |
| | | | | 267/221 |
| 5,450,933 A | * | 9/1995 | Schuttler | E05C 17/30 |
| | | | | 188/300 |
| 5,456,283 A | * | 10/1995 | Schap | F16F 9/516 |
| | | | | 137/514.7 |
| 5,988,608 A | | 11/1999 | Koch | |
| 6,007,057 A | | 12/1999 | Fuhrmann et al. | |
| 6,296,089 B1 | * | 10/2001 | Koch | F16F 9/56 |
| | | | | 188/300 |
| 6,557,924 B2 | * | 5/2003 | Lauderbach | E05C 17/305 |
| | | | | 296/108 |
| 6,913,128 B2 | * | 7/2005 | Muller | F16F 9/516 |
| | | | | 188/282.8 |
| 11,208,836 B2 | | 12/2021 | Goldmann | |
| 12,146,359 B2 | * | 11/2024 | Wittelsbürger | F16F 9/5126 |
| 2006/0249341 A1 | | 11/2006 | Chang | |
| 2017/0211653 A1 | * | 7/2017 | Zuo | F16F 9/5165 |
| 2017/0247922 A1 | * | 8/2017 | Wang | E05F 3/02 |
| 2020/0165856 A1 | * | 5/2020 | Scheuring | F16H 1/46 |
| 2023/0272657 A1 | * | 8/2023 | Wittelsbürger | F15B 13/042 |
| | | | | 60/459 |

FOREIGN PATENT DOCUMENTS

| | | |
|---|---|---|
| DE | 19649836 A1 | 6/1998 |
| DE | 19706919 C1 | 10/1998 |
| DE | 10140580 A1 | 6/2002 |
| DE | 102006030064 A1 | 1/2008 |
| DE | 102017115586 A1 | 1/2019 |
| DE | 102018122135 A1 | 3/2020 |
| EP | 1111266 A2 | 6/2001 |
| JP | S426719 Y1 | 3/1967 |
| JP | 2002372089 A | 12/2002 |
| WO | 2014023433 A1 | 2/2014 |

OTHER PUBLICATIONS

International Search Report for PCT/EP2021/070431, Mailing Date Oct. 19, 2021, English Translation attached to original, All together 7 Pages.
International Preliminary Report on Patentability for PCT/EP2021/070431, Mailing Date Feb. 2, 2023, 10 Pages.

* cited by examiner

DRIVE ARRANGEMENT FOR A FLAP OF A MOTOR VEHICLE

CROSS-REFERENCE TO RELATED APPLICATIONS

This application is the U.S. National Phase of PCT Application No. PCT/EP2021/070431 filed on Jul. 21, 2021, which claims priority to German Patent Application No. DE 10 2020 119 230.4, filed on Jul. 21, 2020, the disclosures of which are hereby incorporated in their entirety by reference herein.

TECHNICAL FIELD

The invention relates to a drive assembly for a hatch, in particular a rear hatch, of a motor vehicle, according to the preamble of claim 1, to a drive assembly for a hatch, in particular a rear hatch, of a motor vehicle, according to the preamble of claim 15, and to a hatch assembly having a hatch, in particular a rear hatch, and such a drive assembly, according to claim 16.

BACKGROUND

The drive assembly discussed is used in the context of the, in particular motorized, adjustment of any type of hatch of a motor vehicle. These hatches may be, for example, rear hatches, rear lids, hoods, cargo area floors, or else doors of a motor vehicle. To this extent, the term "hatch" is to be understood in a wide sense.

The known drive assembly (DE 10 2018 122 135 A1) from which the invention proceeds serves for the motorized adjustment of a rear hatch of a motor vehicle. The drive assembly on one side of the rear hatch has a motorized drive in the form of a spindle drive which has an electric drive unit and disposed downstream of the electric drive unit an operatively connected spindle/spindle nut gear mechanism by way of which linear drive movements between a drive connector on the body and a drive connector on the hatch for opening and closing the hatch are generated. In an open position of the hatch, the spindle drive is in a deployed position, whereas the spindle drive in a closed position of the hatch is in a retracted position.

Since the weight of the rear hatch can be considerable, a gas pressure element in the form of a gas spring which is intended to compensate for the weight of the rear hatch is disposed separately from the spindle drive on the other side of the hatch. It is typically to be achieved in this way that the rear hatch is at all times close to the state of equilibrium or urged in the opening direction. Such a hatch assembly having a motorized drive on the one side and a gas pressure element, presently a gas spring, on the other side of the hatch is also referred to as an active/passive system.

The gas pressure element of the known drive assembly is advantageous to the extent that the latter, in the event that the drive force and/or holding force of the drive fails and the hatch as a result is urged in the closing direction due to the spring force and/or due to gravity, by way of a switchable valve assembly switches the valve assembly to a closed state which counteracts any further adjustment of the hatch and in particular blocks any further adjustment of the hatch. The switchover to the closed state takes place as a function of pressure, thus as a function of the pressure gradient between the two sub-spaces in the gas pressure element, this in turn being a function of the piston velocity, thus the velocity of the piston relative to the cylinder of the gas pressure element. However, in the event of a high introduced force, and a resultant high piston velocity, and blocking of the gas pressure element the pressure in one of the two sub-spaces of the gas pressure element subdivided by the piston can in some circumstances exceed a critical pressure which may lead to damage to the gas pressure element.

The invention is based on the object of designing and refining the known drive assembly in such a manner that damage to the gas pressure element can ideally be prevented.

The above object in a drive assembly according to a first aspect of the disclosure is achieved by the features of the characterizing part the first aspect of the disclosure.

A gas pressure element here is initially very generally understood to be an element having a cylinder and a piston which therein is guided coaxially to the cylinder axis of said cylinder, said gas pressure element in the stationary and/or moving state of the piston relative to the cylinder providing a pneumatic and/or hydraulic pressure, in particular a static and/or dynamic pressure, between the cylinder and the piston of the gas pressure element. The cylinder here is filled with at least one fluid, in particular a gas and/or a liquid, wherein the gas and/or the liquid can be filled into the cylinder under pressure, thus at a pressure above or below the ambient pressure, or without pressure, thus at a pressure which corresponds substantially to the ambient pressure. The gas pressure element is preferably formed solely by a gas spring, in particular a gas compression spring or gas tension spring, thus a cylinder/piston assembly in which the piston is filled with a pressurized fluid, in particular a fluid at a positive pressure. The gas pressure element can also be formed by a gas damper, thus a cylinder/piston assembly in which the piston is filled with a non-pressurized fluid. The gas pressure element as a component part can also have such a cylinder/piston assembly, in particular a gas spring and/or a gas damper, and additionally as a further component part a drive spring assembly which acts parallel to or coaxially with the cylinder axis and thus the effective direction of the gas pressure element or of the gas spring or of the gas damper, respectively. To this extent, the terms "gas pressure element", "gas spring" and "gas damper" are thus to be understood in a wide sense.

In the normal operation, the gas spring or the gas damper of the gas pressure element provided according to the proposal functions as a conventional gas spring or as a conventional gas damper, respectively, which in the customary manner per se has a fluid-filled, in particular gas-filled and/or liquid-filled, cylinder and a piston guided in the cylinder. In this way, the gas pressure element utilizes the compressibility of the fluid filled into the latter, in particular of the gas, for the resilient or damping effect of the gas pressure element. In a gas spring, in the absence of an introduced force, the pressurized fluid presses onto the cross-sectional area of the piston and as a result diverges the drive connector on the cylinder and the drive connector on the piston, the gas spring being in each case coupled to the vehicle by said connectors. When a certain minimum compressive force, for example by an activation of the rear hatch caused manually or by way of a motorized drive, is introduced into the gas spring from the outside by way of the drive connectors, the two drive connectors are converged. In a gas damper in which the fluid is non-pressurized when no force is being introduced, the drive connectors can be moved relative to one another only by way of a compressive force or tensile force which is introduced from the outside by way of the drive connectors, for example by an activation of the rear hatch caused manually or by way of a motorized drive, as a result of which the fluid is impinged with the pressure across the cross-sectional area of the piston.

The piston, in particular the main body thereof also referred to as a piston head, in the case of a gas spring as well as in the case of a gas damper subdivides the cylinder interior space into two sub-spaces, wherein an overflow duct assembly, which is in particular at least partially formed by the main body, has the effect that the fluid for balancing a pressure gradient between the sub-spaces can flow from the one sub-space into the respective other sub-space. The corresponding flow is furthermore referred to as a balancing flow.

When a comparatively high force is introduced into the gas pressure element, for example when the driving force and/or the holding force of the drive fails and the hatch as a result is urged in the closing direction due to the spring force and/or due to gravity, or when the user manually closes the hatch, the piston velocity can increase. It can arise here that the balancing flow cannot flow sufficiently fast through the previous cross section of the overflow duct assembly from the one sub-space to the other sub-space because the cross section is too small for this purpose. As a result, the pressure in one of the sub-spaces increases, and the pressure gradient between the two sub-spaces thus also increases.

The fundamental concept that a switchable valve assembly as a function of the pressure gradient between the two sub-spaces, prior to a critical pressure being crated in one of the two sub-spaces, switches in a self-acting manner to a state which brings about a particularly rapid pressure equalization between the sub-space with the high pressure and the sub-space on the other side of the piston, is essential here. This state in which the valve assembly switches is furthermore referred to as the overload state. Even when high forces are introduced into the gas pressure element and a high piston velocity arises as a result, the gas pressure element can in this way be optimally protected against damage or even destruction.

In the normal operation of the gas pressure element, a pressure equalization between the two sub-spaces separated by the piston in the gas pressure element likewise takes place, as will yet be explained hereunder, wherein a balancing flow between the two sub-spaces that generates the pressure equalization here is less than in the overload state. Moreover, the valve assembly can in particular also switch to a state that decreases the balancing flow when the pressure in one of the sub-spaces is increased to a certain degree, as will likewise yet be explained hereunder. This state is furthermore referred to as the constriction state. Should the pressure in this sub-space thereafter increase even more, the valve assembly then switches to said overload state. It is to be emphasized that the switching procedures here take place in a self-acting manner, thus without any intervention of a user and solely, or in any case significantly, caused by the pressure gradient between the two sub-spaces, said pressure gradient in turn being a function of the piston velocity.

SUMMARY

It is proposed in detail that the valve assembly, when exceeding a predetermined upper limit value for the pressure gradient, switches in a self-acting manner to an overload state in which said valve assembly enlarges, in particular maximizes, the cross section of the overflow duct assembly.

A second aspect of the disclosure defines the possibility of switching to the constriction state already mentioned above. The cross section of the overflow duct assembly is decreased, in particular minimized, in the process.

A third aspect of the disclosure defines preferred piston velocities at which the valve assembly switches to the constriction state and to the overload state.

A fourth aspect of the disclosure relates to the open state of the valve assembly which the valve assembly assumes in the normal operation of the gas pressure element, or else in the resting state of the gas pressure element. When the pressure gradient increases by virtue of an increasing piston velocity, the valve assembly first switches from this open state to the constriction state and, when the pressure gradient by virtue of a still increasing piston velocity is even further increased, said valve assembly switches further to the overload state.

It is again set forth in a fifth aspect of the disclosure how the valve assembly preferably behaves when the pressure gradient drops again. The valve assembly then switches from the overload state to the constriction state and/or from the constriction state to the open state.

A sixth aspect of the disclosure relates to a drive spring assembly which preferably diverges the drive connectors of the gas pressure element by way of which the gas pressure element is fastened to the hatch, on the one hand, and to the motor vehicle body, on the other hand. The drive spring assembly here can also have a coil spring, in particular within the cylinder of the gas pressure element, said coil spring as a pop-up spring counteracting the piston movement only along part of the movement of the piston in the cylinder and being intended for facilitating the opening of the hatch from the closed position.

In a seventh aspect of the disclosure, the valve assembly in the overload state is preferably capable of, in particular abruptly, decreasing the pressure gradient and of then switching in a self-acting manner to the constriction state, as a result of which it can be prevented that a person is jammed in a closing hatch. The drive spring assembly can additionally decelerate the hatch in the process in that the spring force increases as the mutual spacing of the two drive connectors decreases, as a result of which a moment that counteracts the closing movement of the hatch is generated by way of the spring force. This preferably takes place in such a manner that during the closing movement of the hatch a decrease of the shortest perpendicular spacing between the pivot axis of the hatch and the effective line of the spring force is at least partially compensated.

A ninth aspect and a tenth aspect of the disclosure relate to the fundamental construction of the valve assembly and define in particular a valve body which is a function of the pressure gradient and the piston velocity is displaceable in relation to the main body of the piston.

Particularly preferred design embodiments of the overflow duct assembly and in particular of the valve body and of the main body are disclosed by the eleventh, twelfth, and thirteenth aspects of the disclosure According to the likewise preferred design embodiment according to A fourteenth aspect of the disclosure, the valve body, in particular by way of a valve spring assembly, in any case in the at least one constriction position and overload position thereof, is impinged with a force in relation to the main body, preferably toward the at least one open position thereof.

According to a further teaching as provided in a fifteenth aspect of the disclosure, is a drive assembly for a hatch, in particular a rear hatch, of a motor vehicle, having at least one gas pressure element, in particular having a gas spring, wherein the gas pressure element has an externally sealed cylinder and a piston which in the cylinder interior space runs along the cylinder axis and sub-divides the cylinder interior space into two sub-spaces, wherein the gas pressure element has a first drive connector which is connected to the cylinder, and a second drive connector which is connected to the piston, wherein the cylinder is filled with an in particular pressurized fluid, wherein the piston has an overflow duct assembly by way of which, in response to a piston movement, a balancing flow between the two sub-spaces for balancing a pressure gradient between the two sub-spaces is created, and wherein the piston is assigned a switchable valve assembly which, as a function of the pressure gradient between the two sub-spaces, can be brought to different through flow states which differ in terms of the size of the cross section of the overflow duct assembly. Reference may be made to all explanations pertaining to the drive assembly according to the proposal and according to the first teaching.

Here that the valve assembly, when exceeding a predetermined lower limit value for the pressure gradient, switches in a self-acting manner from an open state to a constriction state in that said valve assembly decreases the cross section of the overflow duct assembly in relation to the open state, and when exceeding a predetermined upper limit value for the pressure gradient switches in a self-acting manner from the constriction state to a closing state in that said valve assembly decreases the cross section of the overflow duct assembly in relation to the constriction state. The cross section here, proceeding from the open state, is thus likewise initially decreased in the constriction state, as in the first teaching, but as opposed to the first teaching, subsequently even further decreased in a closing state.

According to a further teaching according to sixteenth aspect of the disclosure, is a batch assembly per se, which has a hatch, in particular rear hatch, and a drive assembly according to the proposal which is assigned to the batch. Reference may be made to all explanations pertaining to the drive assembly according to the proposal and according to the first teaching, and pertaining to the drive assembly according to the proposal and according to the second teaching.

The hatch here is preferably pivotable about a pivot axis which in the assembled state is aligned so as to be substantially horizontal. The gas pressure element particularly preferably preloads the hatch, in particular in the opening direction of the latter. It is provided in particular that the hatch assembly on a first side of the hatch has a drive, in particular a linear drive, preferably a spindle drive, and on the opposite side has the gas pressure element. To this extent, the drive assembly in this instance is in particular an active/passive system.

BRIEF DESCRIPTION OF THE DRAWINGS

The invention will be explained in more detail hereunder by means of a drawing which merely illustrates an exemplary embodiment. In the drawing

DETAILED DESCRIPTION

The drive assembly 1 according to the proposal presently and preferably serves for the motorized adjustment of a hatch 2 of a motor vehicle. The drive assembly 1 according to the proposal in an alternative embodiment, while providing at least one gas spring, may also be purely spring-driven, or while providing at least one gas damper may be purely manually operable. The hatch 2 by means of the drive assembly 1 is adjustable in an opening direction and/or in a closing direction of the hatch 2.

The hatch 2 presently and preferably is a rear hatch of the motor vehicle. The drive assembly 1 according to the proposal can specifically be used in a particularly advantageous manner in the specific application of a "rear hatch", because rear hatches have a comparatively high weight.

In principle however, the drive assembly 1 according to the proposal can also be used in other types of hatches 2 of a motor vehicle. These include rear lids, hoods or the like, or else doors. All explanations apply in analogous manner to other hatches.

Figure 1:
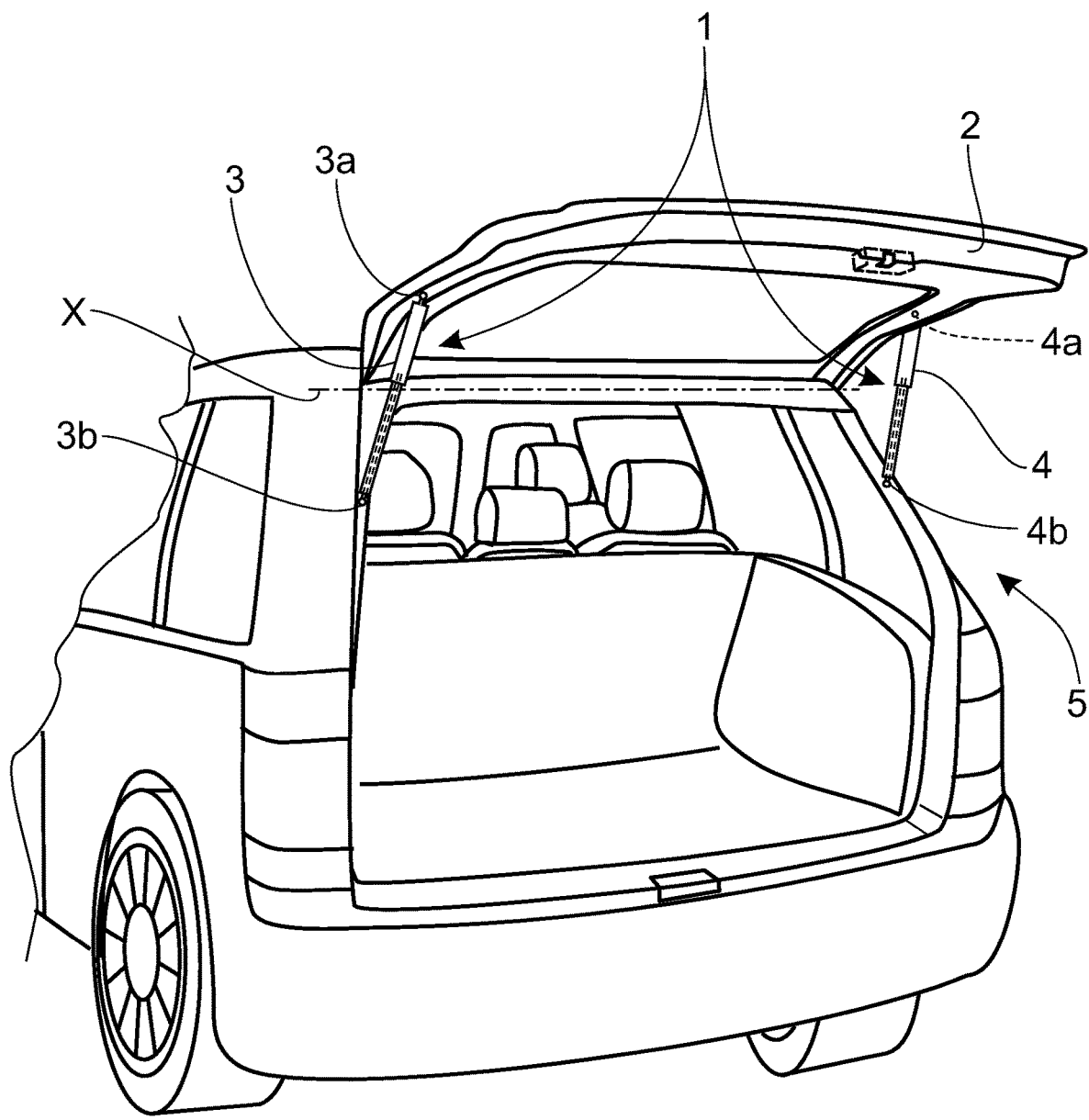
FIG. 1 shows the rear region of a motor vehicle having a hatch assembly according to the proposal which is equipped with a drive assembly according to the proposal.

As is shown in FIG. 1, the drive assembly 1 according to the proposal presently and preferably has a, here exactly one, motorized drive 3. The motorized drive 3 presently and preferably is a linear drive, in particular a spindle drive, as will yet be explained hereunder.

Furthermore, the drive assembly 1 according to the proposal has a, here exactly one, gas pressure element 4. The gas pressure element 4 presently and preferably is a gas spring, in particular a gas compression spring. The gas spring presently and preferably preloads the hatch 2 in the opening direction thereof. The gas spring can in principle also be a gas tension spring. It is also conceivable that the gas pressure element 4 is a gas damper, thus does not have a resilient effect.

In the exemplary embodiment described here, a gas spring by way of example is provided as the gas pressure element 4. Explanations pertaining to the latter however apply in analogous manner to the other gas pressure elements 4 mentioned.

In principle, the drive assembly 1 according to the proposal can also have more than one motorized drive and/or more than one gas pressure element 4. In the hatch assembly 5 illustrated in FIG. 1, which besides the hatch 2 of the motor vehicle also has the drive assembly 1, the motorized drive 3 is disposed on a first side of the hatch 2, and the gas pressure element 4, or the gas spring here, respectively, is disposed on an opposite, second side of the hatch 2.

The motorized drive 3, which here forms the active side of an active/passive system, is specified for opening and closing the hatch 2. For this purpose, the drive 3 has a drive unit, not illustrated here, having an electric drive motor and optionally one or a plurality of further drive components such as an intermediate gearbox, an overload clutch and/or a brake. The drive unit presently and preferably downstream has a linear gearbox, likewise not illustrated, in particular a spindle/spindle nut gear mechanism, operatively connected thereto, the latter as gearbox components having in particular a spindle and a spindle nut meshing therewith. The spindle presently and preferably is operatively coupled to the drive unit and during operation is set in rotation, as a result of which the spindle nut performs a linear movement along the spindle.

The motorized drive 3 which has the drive unit and the linear gearbox, in particular the spindle/spindle nut gear mechanism, has a first drive connector 3a, in particular on the spindle, and a second drive connector 3b, in particular on the spindle nut, by way of which the drive 3 is coupled to the motor vehicle. The drive 3 presently and preferably by way of the drive connector 3a on the spindle is coupled to the hatch 2, and by way of the drive connector 3b on the spindle nut is coupled to the body of the motor vehicle. The linear drive movements of the linear gearbox either diverge the drive connectors 3a, 3b, this corresponding to an adjusting movement of the hatch 2 in the opening direction of the latter, or converge the drive connectors 3a, 3b, this corresponding to an adjusting movement of the hatch 2 in the closing direction thereof.

The gas spring which presently and preferably forms the gas pressure element 4 and which forms the passive side of the active/passive system, does not possess a dedicated drive but presently provides a spring function. The gas spring is thus intended to absorb part of the weight of the hatch 2 and as a result keep the hatch 2 close to the state of equilibrium or urge said hatch 2 in the opening direction when said hatch 2 is opened.

The gas pressure element 4 has a cylinder 6, which in a customary manner per se is externally sealed, and a piston 8 which in the interior space 7 radially enclosed by the cylinder 6 runs along the cylinder axis A and subdivides the cylinder interior space 7 into two sub-spaces 7a, 7b. The piston 8 has a piston rod 8a which runs along the cylinder axis A and is movable relative to the cylinder 6. The piston rod 8a in a sealing manner penetrates an axial opening in the cylinder 6, as a result of which a portion of the piston rod 8a is disposed in the cylinder interior space 7, and a further portion is disposed outside the cylinder 6. The piston 8, on the portion of the piston rod 8a that is disposed in the cylinder interior space 7, in particular on the front end thereof, furthermore has a main body 8b which forms in particular the piston head. The main body 8b presently and preferably has a cross section in terms of a section in the radial direction of the cylinder 6 that corresponds to that of the cylinder interior space 7.

The gas pressure element 4 furthermore has a first drive connector 4a which is connected to the cylinder 6, and a second drive connector 4b which is connected to the piston 8. The cylinder 6 here is filled with pressurized fluid in such a manner that the two drive connectors 4a, 4b are diverged. The fluid is in particular a compressible gas and can optionally, preferably in minor quantities, also contain a liquid such as oil, for example so as to effect damping of a terminal position.

In the unloaded state, thus when no forces act on the gas pressure element 4 from the outside, the two drive connectors 4a, 4b are thus in the maximum diverged position which is shown in FIGS. 1 and 2b). This position of the drive connectors 4a, 4b relative to one another presently and preferably also corresponds to the open position of the hatch 2 illustrated in FIG. 1. The drive connector 4a on the cylinder here is coupled to the hatch 2, and the drive connector 4b on the piston is coupled to the body of the motor vehicle. It is to be emphasized once again that the cylinder 6, as has been explained above, may also be non-pressurized, specifically in the case of a gas damper instead of a gas spring.

The piston 8 has an overflow duct assembly 9 by way of which, in response to a piston movement, a balancing flow between the two sub-spaces 7a, 7b for balancing a pressure gradient between the two sub-spaces 7a, 7b is created.

Figure 2:
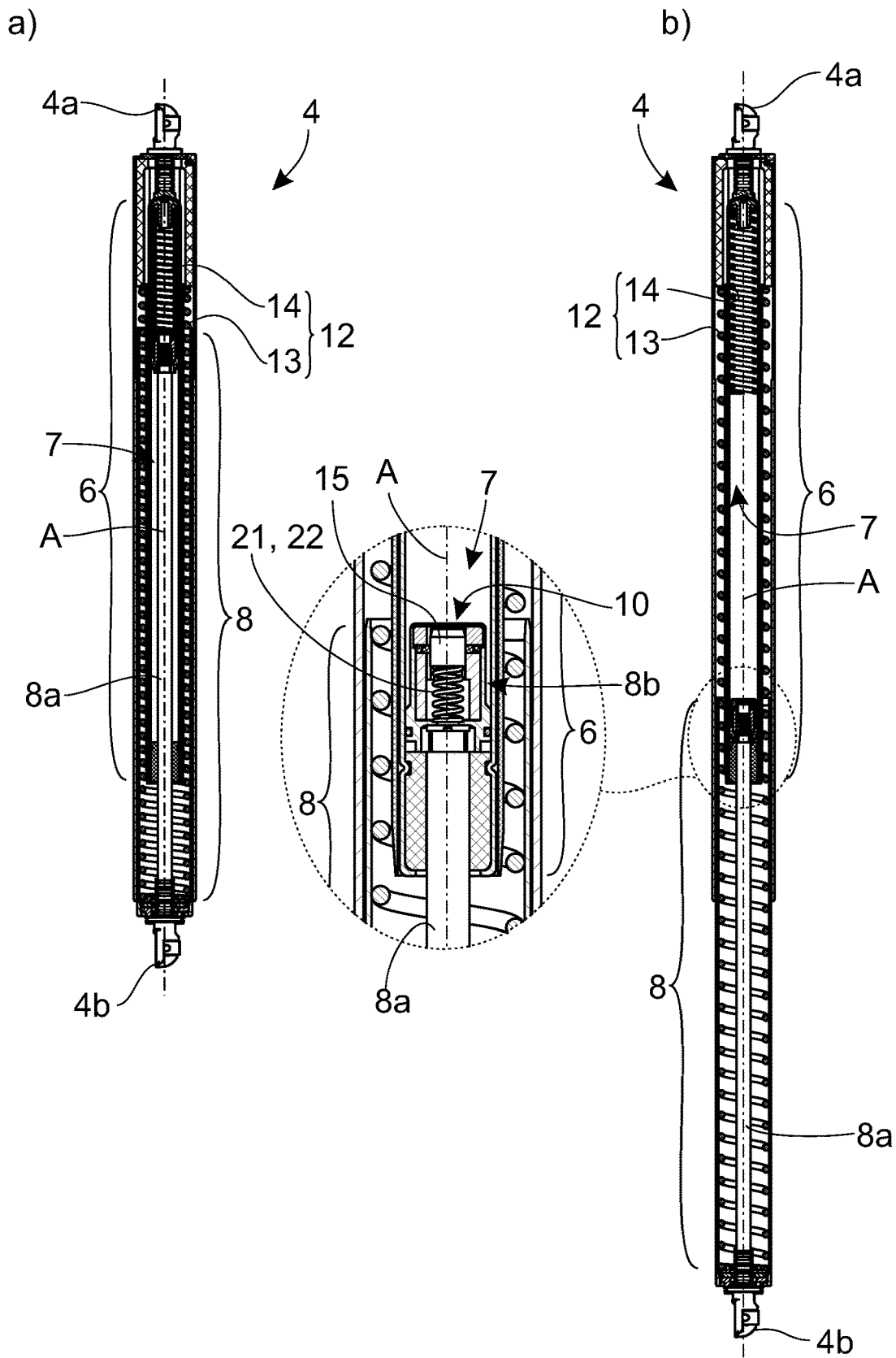
FIG. 2 shows a sectional view of a gas pressure element of the drive assembly according to FIG. 1 in the resting state a) after converging and b) after diverging the drive connectors to the terminal positions thereof.

In the normal operation and in the event of an external force that converges the drive connectors 4a, 4b, for example when closing the hatch 2 in a motorized or manual manner, it arises that the piston 8 from the position shown in FIG. 2b) is deflected relative to the cylinder 6, specifically in the direction of the position shown in FIG. 2a). The portion of the piston 8 that is disposed in the cylinder interior space 7 is thus displaced along the cylinder axis A through the cylinder interior space 7, as a result of which the two sub-spaces 7a, 7b of the cylinder interior space 7 change their volume. As can be derived from FIG. 2, in the exemplary embodiment the volume of the sub-space 7a is decreased when the drive connectors 4a, 4b are converged, whereas the volume of the sub-space 7b is enlarged. As is shown in the detailed view in FIG. 3a), the fluid as a balancing flow flows from the upper sub-space 7a by way of the overflow duct assembly 9 into the lower sub-space 7b. Since the fluid presently and preferably is filled into the cylinder 6 under pressure, the fluid presses onto the cross-sectional area of the piston 8, here of the main body 8b, and as a result continually presses the piston 8 relative to the cylinder 6 to the position illustrated in FIG. 2b). The reason therefor lies in that the cross-sectional area of the piston 8, or of the main body 8a, on the side facing away from the piston, here thus toward the sub-space 7a, is larger than on the opposite side, because the cross-sectional area impinged by the fluid pressure on the opposite side is formed only by a ring running about the piston rod 8a. The effective annular area on the side of the sub-space 7b is smaller than the effective area on the side of the sub-space 7a, the latter corresponding to the entire cross section of the cylinder interior space 7. Accordingly, a higher compressive force acts on the piston 8, or on the main body 8, respectively, from the sub-space 7a than from the other side, as a result of which the piston 8 is continually pushed out of the cylinder 6.

The piston 8 is assigned a switchable valve assembly 10 which, as a function of the pressure gradient between the two sub-spaces 8a, 8b, is able to be brought to different throughflow states which differ in terms of the size of the cross section of the overflow duct assembly 9. The cross section of the overflow duct assembly 9 means the cross section that is available for the balancing flow and is able to be passed through by a flow when balancing the pressure. When the two drive connectors 4a, 4b are converged the pressure gradient here varies as a function of the piston velocity v, thus the velocity at which the piston 8 is moved relative to the cylinder 6. As the piston velocity v increases, the balancing flow can no longer balance the pressure gradient between the two sub-spaces 7a, 7b as fast as is necessary such that the pressure in the one of the sub-spaces, here the sub-space 7a keeps increasing. Accordingly, the compressive force which acts on the main body 8b and the valve assembly 10 increases, this leading to the valve assembly 10 switching to another throughflow state, as will yet be explained in more detail hereunder.

It is essential, in particular when the two drive connectors 4a, 4b are converged, that the valve assembly 10 when exceeding a predetermined upper limit value for the pressure gradient switches in a self-acting manner to an overload state in that said valve assembly 10 enlarges, in particular maximizes, the cross section of the overflow duct assembly 9.

The cross section of the overflow duct assembly 9, meaning the cross-sectional area orthogonal to the flow direction of the balancing flow, is defined as follows: if the overflow duct assembly 9 has a plurality of fluid ducts 11 which serve for fluidically connecting, i.e. for routing the balancing flow between, the two sub-spaces 7a, 7b, the cross section of the overflow duct assembly 9 in this instance corresponds to the sum of all narrowest cross sections of the fluid ducts 11, thus is the overall cross section which is derived from the sum of all individual cross sections at the respective narrowest location of the fluid ducts 11. If the overflow duct assembly 9 has only a single such fluid duct 11, the cross section of the overflow duct assembly 9 in this instance corresponds to the cross section at the respective narrowest location of this fluid duct 11.

The valve assembly 1 enlarging the cross section of the overflow duct assembly 9 means that the cross section of the overflow duct assembly 9 then becomes larger than the latter was prior thereto in the previous throughflow state, specifically in the constriction state yet to be described hereunder. "Maximizing" means that the cross section of the overflow duct assembly 9 then not only becomes larger but the largest cross section that the overflow duct assembly 9 can provide from the sum of all narrowest cross sections is then reached.

The valve assembly 10 then functions in the manner of a relief valve. If the pressure as a result of a particularly high piston velocity v in the sub-space 7a becomes excessive, the predetermined upper limit value for the pressure gradient thus being exceeded, the valve assembly 10 is opened and enables an, in particular abrupt, pressure equalization between the sub-space 7a and the sub-space 7b. As a result of such a pressure equalization, damage to the gas pressure element 4 is avoided when in the event of an overload a very high force suddenly converges the two drive connectors 4a, 4b ever more rapidly, as a result of which the piston velocity v is increased.

The previously described function according to which the valve assembly 10 can switch to the overload state is illustrated in FIG. 3c). FIG. 3a) shows an open state of the valve assembly 10 which is yet to be described in more detail hereunder and which said valve assembly 10 assumes in the normal operation of the gas pressure element 4. FIG. 3b) shows a state of the valve assembly 10 between the open state and the overload state, the so-called constriction state, which will be described hereunder.

In this way, the valve assembly 10, in particular when the two drive connectors 4a, 4b are converged, when exceeding a predetermined lower limit value for the pressure gradient, presently and preferably switches in a self-acting manner to said constriction state in that said valve assembly 10 decreases, in particular minimizes, the cross section of the overflow duct assembly 9. The cross section of the overflow duct assembly 9 upon exceeding the predetermined lower limit value for the pressure gradient and until reaching the predetermined upper limit value for the pressure gradient, thus in the constriction state, presently and preferably remains open, however by way of a smaller cross section. In this way, the overflow duct assembly 9 continues to be able to be passed through by a flow. In principle however, according to another embodiment not illustrated here, it is also conceivable that the cross section of the overflow duct assembly 9 is closed, thus is no longer able to be passed through by a flow. The constriction state is thus not necessarily a through flow state in which the cross section is only decreased in relation to the previous throughflow state, but the cross section can also be completely closed. The valve assembly 10 then assumes the constriction state either until an overload event arises by virtue of a further increasing piston velocity v and of a pressure gradient which further builds up as a result, the valve assembly 10 thus switching to the overload state, or until the gas pressure element 4 changes back to the normal operation because the piston velocity v and correspondingly the pressure gradient have become smaller, for example by the absence of an additional force acting on the hatch 2, in particular during the closing procedure.

The valve assembly 10 decreasing the cross section of the overflow duct assembly 9 means that the cross section of the overflow duct assembly 9 then becomes smaller than the latter was prior thereto in the previous throughflow state, specifically the open state yet to be described hereunder. "Minimized" means that the cross section of the overflow duct assembly 9 then not only becomes smaller, but the smallest cross section which the overflow duct assembly 9 can provide from the sum of all narrowest cross sections is reached. As indicated, the smallest cross section can also mean that the overflow duct assembly 9 is then closed or is not able to be passed through by a flow.

Exceeding a predetermined lower limit value here means that the pressure gradient continues to increase but does not lead to switching of the valve assembly 10 until the predetermined lower limit value is reached. It is only when the lower limit value is exceeded that the valve assembly 10 switches in a self-acting manner and as a result decreases the cross section of the overflow duct assembly 9.

As a result of the decrease of the cross section of the overflow duct assembly 9, the damping, also referred to as the damping force, that is exerted on the piston 8 when the latter moves in the cylinder 6 is increased. As a result, the piston movement, thus the movement of the piston 8 in the cylinder 6, is counteracted. The damping thus counteracts the force that is introduced into the gas pressure element 4 and converges the drive connectors 4a, 4b, as a result of which the piston velocity v is decreased, assuming a constant or lower force that is introduced into the gas pressure element 4. As a result, the adjusting movement, in particular the closing movement, of the hatch 2 is decelerated.

The lower limit value for the pressure gradient of a piston velocity v is presently and preferably in a range from 15 mm/s to 100 mm/s, preferably from 30 mm/s to 80 mm/s, furthermore preferably from 40 mm/s to 60 mm/s, in particular corresponds to 40 mm/s, and/or the upper limit value for the pressure gradient of a piston velocity v is in a range from 25 mm/s to 120 mm/s, preferably from 40 mm/s to 100 mm/s, furthermore preferably from 50 mm/s to 80 mm/s, in particular corresponds to 50 mm/s.

It can be provided here that the damping force when reaching the lower limit value for the pressure gradient is in a range from 100 N to 800 N, preferably from 200 to 700 N, furthermore preferably from 400 N to 500 N, in particular is 450 N, and/or that the damping force when reaching the upper limit value for the pressure gradient is in a range from 300 N to 3000 N, preferably from 500 to 2000 N, furthermore preferably from 700 N to 1500 N, in particular is 900 N.

Proceeding from the resting state of the gas pressure element 4, the damping force in the normal operation preferably increases relative slowly until reaching the lower limit value for the pressure gradient, for example from approximately 350 N in the case of a stationary piston to approximately 450 N at a piston velocity v of 40 mm/s. Furthermore, the damping force in the constriction state preferably increases relatively fast until reaching the upper limit value for the pressure gradient, for example from approximately 450 N at a piston velocity v of 40 mm/s to approximately 900 N at a piston velocity v of 50 mm/s. Finally, the damping force in the overload state then preferably remains substantially constant, for example at approximately 900 N at a piston velocity v of more than 50 mm/s.

As has already been explained and illustrated in FIG. 3a), the valve assembly 10, in particular when the two drive connectors 4a, 4b are converged, in the normal operation of the gas pressure element 4 assumes an open state in which the overflow duct assembly 9 has a cross section which is larger than in the constriction state and/or smaller than in the overload state. This moreover also applies for the respective resting state of the gas pressure element 4 shown in FIGS. 2a) and b), thus when said gas pressure element 4 is not being operated and the two drive connectors 4a, 4b are thus mutually stationary, no pressure gradient at all then being present. Additionally or alternatively, it can be provided that the valve assembly 10, in particular when the two drive connectors 4a, 4b are converged, in the case of an increasing pressure gradient can switch in a self-acting manner from an open state, in which the overflow duct assembly 9 has a cross section which is larger than in the constriction state and/or smaller than in the overload state, to the overload state, in particular via the constriction state.

The self-acting switching of the valve assembly 10 from the open state to the constriction state and optionally further to the overload state is in particular provided only in a single adjustment direction of the gas pressure element 4, in particular in the adjustment direction corresponding to the closing direction of the hatch 2. In principle however, in another embodiment not illustrated here, it is also conceivable that the self-acting switching of the valve assembly 10 from the open state to the constriction state and optionally further to the overload state is additionally or alternatively provided in the adjustment direction corresponding to the opening direction of the hatch 2.

In the drive assembly 1 illustrated here and to this extent preferred, it is furthermore the case that the valve assembly 10 when undershooting the predetermined upper limit value for the pressure gradient switches in a self-acting manner from the overload state to the constriction state, and/or that the valve assembly 10 when undershooting the predetermined lower limit value for the pressure gradient switches in a self-acting manner from the constriction state to the open state. This applies in any case when the two drive connectors 4a, 4b are converged, in particular however also when the two drive connectors 4a, 4b are diverged, for example by the optional drive spring assembly 12 described hereunder.

In this way, the gas pressure element 4, as is illustrated for the present exemplary embodiment in FIG. 2, presently and preferably has a drive spring assembly 12 which has at least one first coil spring 13 and/or at least one second coil spring 14. The first coil spring 13 and/or the second coil spring 14 is particularly a coil compression spring or a coil tension spring as here, which is preferably disposed parallel to or coaxially with the cylinder 6. In particular, the first coil spring 13 here radially surrounds the cylinder 6. The second coil spring 14 here is in particular radially enclosed by the cylinder 6.

The at least one first coil spring 13 preferably serves for diverging the drive connectors 4a, 4b, wherein the first coil spring 13 counteracts the piston movement in particular across the entire range of movement of the piston 8, thus across the entire stroke of the latter. The at least one second coil spring 14 preferably counteracts the piston movement only across the last part of the range of movement of the latter when the two drive connectors 4a, 4b are converged.

The valve assembly 10, optionally assisted by the drive spring assembly 12, presently and preferably is conceived such that, in the overload state, when the two drive connectors 4a, 4b are converged, the pressure gradient can be, in particular abruptly, decreased, specifically by enlarging the cross section of the overflow duct assembly 9 until the predetermined upper limit value for the pressure gradient is undershot again, such that the valve assembly 10 switches in a self-acting manner to the constriction state.

"Can be decreased" means that the pressure gradient is decreased at least when the force that is introduced into the gas pressure element 4 and converges the drive connectors 4a, 4b remains constant or drops. This is the case for example, when the force that is introduced into the gas pressure element 4 and converges the drive connectors 4a, 4b results solely from the weight of the hatch 2. In that the valve assembly 10, caused by the in particular abrupt decrease of the pressure gradient, is moved to the constriction state, the damping is increased as a result of the decrease of the cross section of the overflow duct assembly 9 associated therewith, as a result of which the piston movement and correspondingly the movement of the two drive connectors 4a, 4b toward one another can be decelerated.

As mentioned, the valve assembly 10 here can be assisted by the drive spring assembly 12. This means that when the two drive connectors 4a, 4b are being converged, the spring force of the drive spring assembly 12 counteracts the piston movement, specifically preferably permanently by way of the first coil spring 13 and in particular additionally also in portions by way of the second coil spring 14. As a result, the piston movement, and correspondingly the movement of the two drive connectors 4a, 4b toward one another, can be additionally decelerated at least in a limited sub-range of the pivoting movement of the hatch 2.

It is also conceivable here that, caused by the in particular abrupt decrease of the pressure gradient, the valve assembly 10, via the constriction state, even switches temporarily to the open state, because the lower limit value for the pressure gradient is also temporarily undershot, and then switches back to the constriction state in which the piston movement and correspondingly the movement of the two drive connectors 4a, 4b toward one another is then decelerated by the decrease of the cross section of the overflow duct assembly 9.

In principle, it is also conceivable that the above switching procedures are carried out multiple times in order to decelerate the closing movement of the hatch 2 of the motor vehicle in the event of an overload. The valve assembly 10, caused by the in particular abrupt decrease of the pressure gradient then switches to the constriction state which increases the damping, but, because the pressure gradient increases again, then switches back to the overload state in which the damping is decreased again. The valve assembly 10, caused by the renewed in particular abrupt decrease of the pressure gradient, then again switches to the constriction state which increases the damping. With every new switchover to the constriction state the piston velocity v is then further decreased in comparison to the last time, i.e. when the valve assembly 10 was in the constriction state, and the pivoting movement of the hatch 2 is decelerated.

In order for the pivoting movement of the hatch 2 to be decelerated, it is advantageous for the drive spring assembly 12, as in the present exemplary embodiment, to be conceived such that the spring force of said drive spring assembly 12 increases as the mutual spacing of the two drive connectors 4a, 4b decreases, preferably in such a manner that in the closing movement of the hatch 2 a decrease of the shortest perpendicular spacing between the pivot axis X of the hatch 2 and the effective line of the spring force, from which the moment acting on the hatch 2 results, is at least partially, preferably completely compensated.

In this way, an optimal assistance of the valve assembly 10 by the spring assembly 12 is provided preferably across almost the entire pivoting range of the hatch. Decelerating a closing hatch can be carried out even more effectively in this way.

Figure 3:
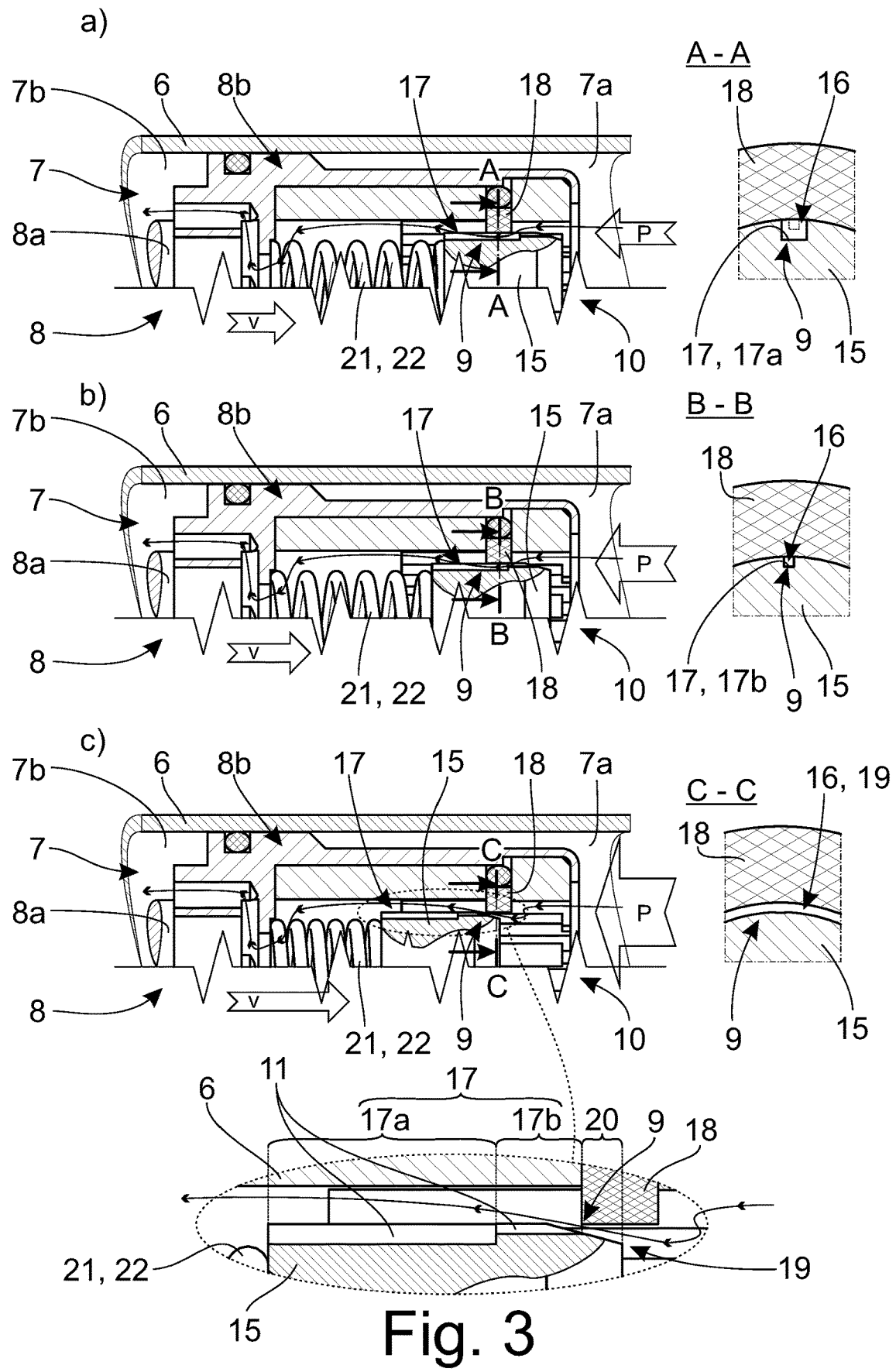
FIG. 3 shows a sectional view of a valve assembly of the gas pressure element according to FIG. 1 in an enlarged illustration a) in an open state, b) in a constriction state, and c) in an overload state.

A particularly preferred embodiment of a gas pressure element 4 is to be described hereunder by means of the illustration in FIG. 3.

As has already been explained above, the piston 8 has a piston rod 8a and a main body 8b which is fastened to the piston rod 8a, in particular so as to be axially fixed on the latter, and which is in particular at least partially sealed in relation to the inner surface of the cylinder. The valve assembly 10 presently and preferably again has a valve body 15 which is movable relative to the main body 8b, in particular axially movable relative to the main body 8b, and which is in particular disposed within, preferably radially within, the main body 8b. The valve body 15 presently and preferably according to FIG. 3 and FIG. 4a), across at least part of the axial extent thereof, preferably the major part of the axial extent thereof, furthermore preferably the entire axial extent thereof, is radially surrounded by the main body 8b at least in the open position of said valve body 15 yet to be described hereunder, in particular in each of the switch positions yet to be described hereunder. In the variants in FIG. 4b) and FIG. 4c) the valve body 15 presently and preferably extends across at least part of the axial extent thereof, preferably the major part of the axial extent thereof, extends axially outside the main body 8b, at least in the open position of said valve body 15 yet to be described hereunder, in particular in each of the switch positions yet to be described hereunder.

The overflow duct assembly 9 here is configured between the main body 8b and the valve body 15. The valve body 15 presently and preferably is routed along the cylinder axis A on, in particular in, the main body 8b.

The valve body 15 presently and preferably is adjustable in relation to the main body 8b of the piston 8 to a plurality of switch positions, comprising at least one open position (FIG. 3a)) in which the valve assembly 10 assumes the open state, at least one constriction position (FIG. 3b)) in which the valve assembly 10 assumes the constriction state, and/or at least one overload position (FIG. 3c)) in which the valve assembly 10 assumes the overload state. To this end, the valve body 15 here, proceeding from the initial position thereof (FIG. 2) which said valve body 15 assumes in the resting state of the gas pressure element 4, is able to be deflected toward the piston rod 8a, preferably counter to a spring force as is yet to be described hereunder. The valve body 15 in relation to the main body 8b of the piston 8, as is also the case here, can preferably assume a plurality of open positions in which the valve assembly 10 assumes the open state, a plurality of constriction positions in which the valve assembly 10 assumes the constriction state, and/or a plurality of overload positions in which the valve assembly 10 assumes the overload state. In this case, the valve body 15 can thus assume a plurality of positions of the "open position" type, a plurality of positions of the "constriction position" type, and/or a plurality of positions of the "overload position" type. In this way, the initial position shown in FIG. 2 here, as well as the position shown in FIG. 3a), is in each case a position of the "open position" type, thus an open position in which the valve assembly 10 assumes the open state.

The overflow duct assembly 9 now has one or a plurality of fluid ducts 11 which serve for fluidically connecting the two sub-spaces 7a, 7b. These fluid ducts 11, in any case in the overload state and in the open state, fluidically connect the two sub-spaces 7a, 7b to one another. To this end, the fluid ducts 11 run between the main body 8b and the valve body 15. A bottleneck 16 which defines the smallest cross section of the fluid duct 11 that can be passed through by a balancing flow is provided or able to be generated in one or a plurality of the fluid ducts 11. The respective cross section of at least one bottleneck 16 or of all bottlenecks 16 and/or the overall cross section of all bottlenecks 16 varies as a function of the switch position (overload position, constriction position, open position) of the valve body 15 in relation to the main body 8b of the piston 8.

"Provided or able to be generated" means that either a bottleneck 16 is permanently present in the respective fluid duct 11 and the cross section of this bottleneck 16 varies as a function of the switch position of the valve body 15 in that the radial contour of the bottleneck 16 as a function of the switch position of the valve body 15, when the latter is displaced relative to the main body 8b, in portions is formed by dissimilarly-shaped material portions in particular of the valve body 15. Or a fluid duct 11 which is not active in a specific switch position of the valve body 15, thus in this switch position does not fluidically connect the two sub-spaces 7a, 7b to one another and thus also does not have any bottleneck 16 that is able to be passed through by a flow, is active in another switch position of the valve body 15, in this instance in this switch position thus fluidically connecting the two sub-spaces 7a, 7b, as a result of which a bottleneck 16 is formed in the first place. The fluid duct 11 is thus "switched on" in this instance, wherein another fluid duct 11 having a bottleneck 16 of another cross section is then optionally "switched off", thus no longer being active in this instance. The latter can be implemented in that, for example, fluid ducts 11 of dissimilar length are provided across the circumference of the valve body 15, said fluid ducts 11 in particular in the active state differing in terms of the cross section of their respective bottleneck 16, wherein different ones of the fluid ducts 11 or a different number of fluid ducts 11 are able to be passed through by a flow of the balancing flow as a function of the switch position.

The overall cross section here is the sum of all cross sections of the individual bottlenecks 16. The respective bottleneck 16, thus the location with the respective smallest cross section of the fluid duct 11 that can be passed through by a flow, in the exemplary embodiment illustrated here is displaced as a function of the switch position of the valve body 15, that is to say that the bottleneck 16, depending on the switch position of the valve body 15, is configured at different locations of the valve body 15 or of the main body 8b.

Presently and preferably one groove 17 here is configured for each fluid duct 11 in the valve body 15. The bottleneck 16 of the fluid duct 11 presently and preferably in one or a plurality of types of switch positions, in particular in the "constriction position" and/or "open position" type, thus in a constriction position and/or open position, here is in each case configured between a groove portion 17a, 17b of the groove 17 and a mating part 18, in particular an annular seal, on the main body 8b. Additionally or alternatively, as in the present exemplary embodiment, in a type of switch positions, in particular in the "overload position" type, thus in an overload position, the bottleneck 16 of the fluid duct 11 is an annular space 19 between the valve body 15, here a chamfered material portion 20, and the mating part 18 on the main body 8b, here the annular seal. In this context, an annular space 19 is a completely encircling void which is able to be passed through by a flow of the fluid.

The bottleneck 16 of the fluid duct 11 in each of the mentioned switch positions of the valve body 15 is thus formed at another portion, for example the groove portion 17a, 17b, or the chamfered material portion 20, of the valve body 15.

According to an alternative embodiment not illustrated here, it can also be provided that one groove 15 is configured for each fluid duct 11 in the main body 8b, wherein preferably the bottleneck 16 of the fluid duct 11 in this instance in one of a plurality of types of switch positions, in particular in the "constriction position" and/or "open position" type, thus in a constriction position and/or open position, is in each case formed between a groove portion 17a, 17b of the groove 17 and a mating part 18, in particular an annular seal, on the valve body 15. In this case, it can be additionally or alternatively provided that in one type of switch positions, in particular in the "overload position" type, thus in an overload position, the bottleneck of the fluid duct 11 is an annular space 19 between the main body 8b and the mating part 18 on the valve body 15.

As can best be seen in FIG. 3a), the groove 17 presently and preferably has a first groove portion 17a having a larger cross section and/or a larger depth and/or width and, adjoining thereto, a second groove portion 17b having a smaller cross section and/or smaller depth and/or width. The second groove portion 17b presently and preferably opens into a material portion 20 that is chamfered or recessed in an encircling manner. While not illustrated here, it can alternatively also be provided that the second groove portion 17b opens into a third groove portion which has a larger cross section and/or a larger depth and/or width than the first and/or the second groove portion 17a, 17b.

As has been mentioned, the valve body 15 presently and preferably is the component which for forming the respective fluid duct 11 is provided with a groove 17. Accordingly, the present the chamfered material portion 20 is also part of the valve body 15.

A chamfered material portion 20 is a portion of the valve body 15 in which the outer surface of the valve body 15 does not extend parallel to the movement axis of the valve body 15, said movement axis here running coaxial with the cylinder axis A, but extends obliquely thereto. Therefore, the cross section of the valve body 15 decreases in this chamfered material portion 20, specifically not only as in the case of a groove 17 in a narrow circumferential segment but across a comparatively large circumferential region and preferably across the entire circumference. Therefore, the space which is able to be passed through by a flow when viewed in the circumferential direction is larger than in the case of a groove 17. As is shown in FIG. 3c), a significantly larger cross section of the overflow duct assembly 9 that is able to be passed through by a flow is achieved in comparison to a groove 17 in this way. As a result, in the overload position, said annular space 19 is preferably configured between the material portion 20 that is chamfered in an encircling manner and the mating part 18, here the annular seal.

The same effect as can be achieved with a material portion 20 that is chamfered in encircling manner can also be achieved with a material portion that is recessed in an encircling manner (not illustrated).

It is to be emphasized again at this point that the valve body 15 as the presently preferred embodiment has the respective groove 17 and the chamfered material portion 20. According to another embodiment not illustrated here, this may also be provided on the main body 8b, wherein the respective mating part 18, or the annular seal, respectively, would have to be provided on the valve body 15, as has been mentioned.

As is shown in FIG. 3, the first groove portion 17a presently and preferably is disposed toward the sub-space 7b in which the fluid has the lower pressure when the two drive connectors 4a, 4b are converged. This first groove portion 17a opens in particular into the sub-space 7b. The second groove portion 17b then adjoins the latter toward the sub-space 7a. The sub-space 7a here is the sub-space in which the fluid has the higher pressure when the two drive connectors 4a, 4b are converged.

The terms "smaller" and "larger" or "lower" and "higher" always relate to one another, meaning for example that the "smaller" cross section is smaller than the "larger" cross section or that the "lower" pressure is smaller than the "higher" pressure.

FIGS. 3a), 3b) and 3c) in this sequence visualize that in the open state the groove portion 17a conjointly with the mating part 18, or the annular seal, initially forms the cross section which for balancing the pressure gradient between the two sub-spaces 7a, 7b is passed through by a flow of the fluid. If the pressure gradient is now increased, the valve body 15 as a result of the increased pressure in the sub-space 7a is pushed in the direction of the sub-space 7b, as a result of which the constriction state is achieved in this instance. In the constriction state, the groove portion 17b conjointly with the mating part 18, or the annular seal, then forms the cross section which for balancing the pressure gradient between the two sub-spaces 7a, 7b is passed through by a flow of the fluid. If the pressure gradient is further increased, the valve body 15 as a result of the increased pressure in the sub-space 7a is pushed even further in the direction of the sub-space 7b, as a result of which the overload state is achieved in this instance. In the overload state, the chamfered material portion 20 conjointly with the mating part 18, or the annular seal, then forms the present annular cross section which for balancing the pressure gradient between the two sub-spaces 7a, 7b is passed through by a flow of the fluid.

Figure 4:
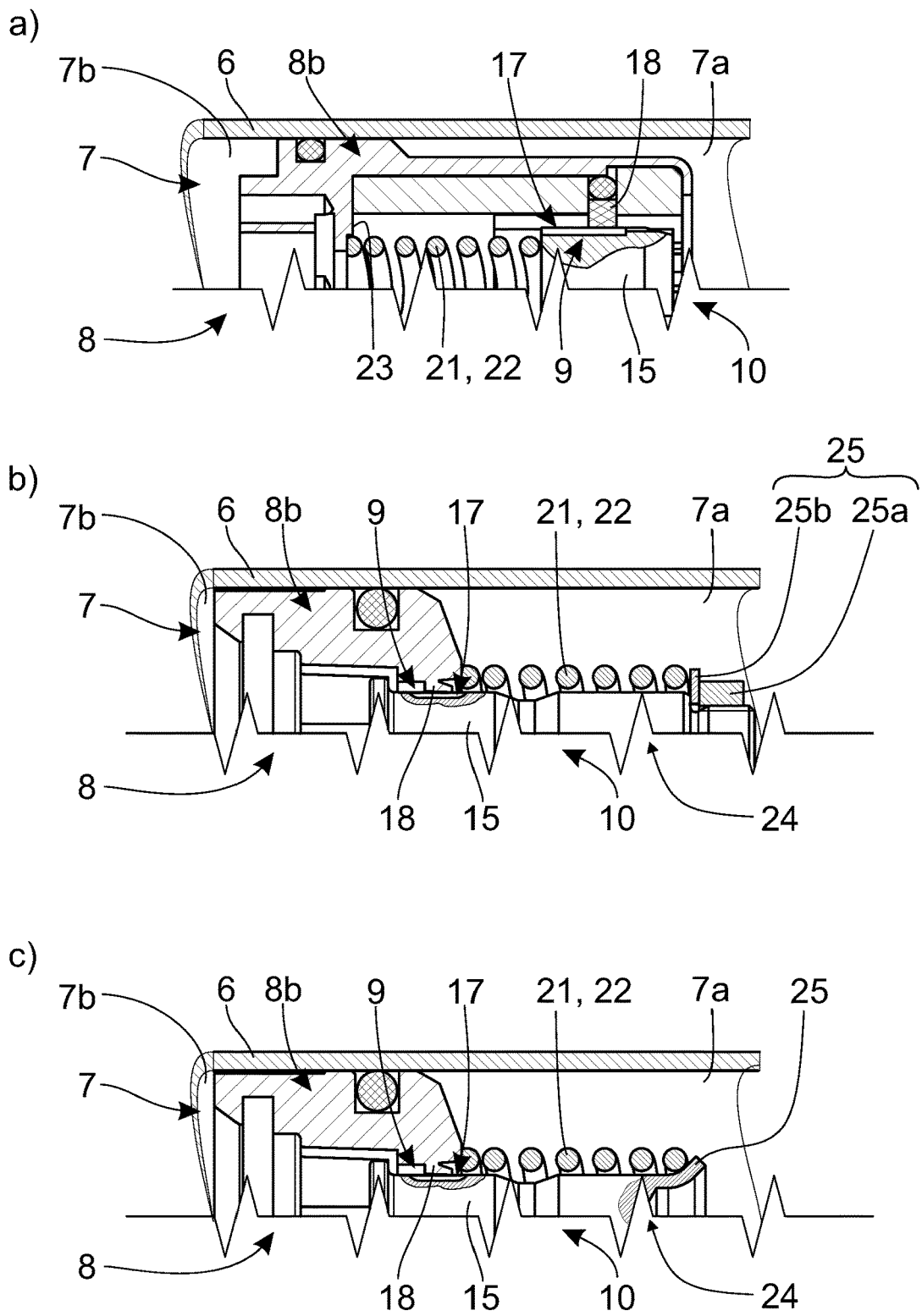
FIG. 4 shows a sectional view of the valve assembly of the gas pressure element according to FIG. 1 in an enlarged illustration a) in a first variant, b) in a second variant, and c) in a third variant.

As is shown in FIG. 3 and FIG. 4, the valve body 15 here is impinged on by a force when the latter is deflected from the initial position of the valve body 15 which the latter assumes in the resting state of the gas pressure element 4. Provided presently and preferably to this end is a valve spring assembly 21 having at least one valve spring 22, wherein the valve spring assembly 21, or the at least one valve spring 22, respectively, interacts with the valve body 15 such that the latter, proceeding from the initial position thereof, in relation to the main body 8b is impinged with a spring force, specifically preferably toward the at least one open position or initial position, respectively, of said valve body 15.

Different variants of the valve spring assembly 21 are illustrated in FIGS. 4a) to c). FIG. 4a) here corresponds to the variant which is also shown in FIGS. 3a to c). The variants shown differ in terms of the position of the at least one valve spring 22 within the valve assembly 10.

Provided according to FIG. 3 or 4a), respectively, on the side that points toward the lower sub-space 7b of the cylinder interior space 7, in particular the end side of the valve body 15, is a valve spring 22 which presently and preferably is the only valve spring 22 of the valve spring assembly 21. The valve spring 22 presently and preferably at one end is supported on the main body 8b or the piston rod 8a, here a radially inward-projecting portion 23, and at the other end on the valve body 15, here the side that points toward the lower sub-space 7b of the cylinder interior space 7, in particular the end side, of the valve body 15. The valve spring 22 presently and preferably across at least part of the axial extent thereof, preferably the major part of the axial extent thereof, furthermore preferably across the entire axial extent thereof, is radially surrounded by the main body 8b.

According to FIG. 4b) and FIG. 4c), an axial portion 24 of the valve body 15 protrudes axially from the main body 8b into the upper sub-space 7a of the cylinder interior space 7. This portion 24, so as to be spaced apart from the main body 8b, in particular on the end thereof that points away from the main body 8b as here, has a radial enlargement 25 which forms an axial contact face for a valve spring 22 which presently and preferably forms the only valve spring 22 of the valve spring assembly 21. The valve spring 22 presently and preferably is disposed on the side that points toward the upper sub-space 7a of the cylinder interior space 7, in particular the end side of the main body 8b, and/or radially surrounds the valve body 15 in particular across the entire axial extent of said valve spring 22. The valve spring 22 presently and preferably at one end is supported on the main body 8b, here the end side thereof, and at the other end on the valve body 15, here the radial enlargement 25 of the valve body 15. The valve spring 22 presently and preferably across at least part of the axial extent thereof, preferably the major part of the axial extent thereof, furthermore preferably the entire axial extent thereof, is disposed axially outside the main body 8b.

In principle, a combination of the above variants is also conceivable in that the valve spring assembly 21 has at least two valve springs 22. In this case, one valve spring 22 is disposed on the side that points toward the lower sub-space 7b of the cylinder interior space 7, in particular the end side, of the valve body 15, as in FIG. 3 or 4a), respectively, and is preferably supported at one end on the main body 8b or the piston rod 8a, in particular a radially inward-projecting portion 23, and at the other end on the valve body 15, in particular the side that points toward the lower sub-space 7b of the cylinder interior space 7, in particular the end side, of the valve body 15. A further valve spring 22 is then disposed on the side that points toward the upper sub-space 7a of the cylinder interior space 7, in particular the end side of the main body 8b, as in FIG. 4b) or 4c), respectively, and/or in particular across the entire axial extent of said valve spring 22 radially surrounds the valve body 15. This further valve spring 22 is preferably supported at one end on the main body 8b, in particular the end side thereof, and at the other end of the valve body 15, in particular the radial enlargement 25 of the valve body 15.

The radial enlargement 25 can be formed in various ways. According to FIG. 4b), said radial enlargement 25 is formed by a screw nut 25a which is screwed onto the valve body 15, in particular at the end side. Presently and preferably, a washer 25b is also component part of the radial enlargement 25. The screw nut 25a and/or the washer 25b here protrude into the axial projection of the spring material, in particular of the spring wire, of the valve spring 22 such that the latter can be axially on the screw nut 25a or, as here, on the washer 25b. According to FIG. 4c), the radial enlargement 25 is formed by radially widening the material of the valve body 15, in particular at the end thereof that points away from the main body 8b. The widened material of the valve body 15 here protrudes into the axial projection of the spring material, in particular of the spring wire, of the valve spring 22 such that said valve spring 22 can bear axially on the widened material.

The valve body 15 in FIG. 3 or 4a), respectively, as well as in FIG. 4b) and in FIG. 4c) is in each case able to be deflected to the left toward the piston rod 8a and at least in the deflected state is correspondingly impinged by the valve spring assembly 15 by a spring force to the right toward the at least one open position of said valve body 15. In this way, the valve assembly 10 in the resting state and in the normal operation of the gas pressure element 4 here always assumes the open state. In principle, the valve body 15 in the open state of the valve assembly 10 can be free of the spring force or be impinged by a spring force.

As indicated above, in another embodiment not illustrated here, the switching procedures described additionally or alternatively are also conceivable in the opposite direction. In this instance, the valve body 15, proceeding from the initial position thereof which said valve body 15 assumes in the resting state of the gas pressure element 4, would be additionally or alternatively able to be deflected in the opposite direction, here away from the piston rod 8a, counter to a force, in particular counter to a spring force provided by the valve spring assembly 21.

In any case, it is presently and preferably the case that the respective valve spring 22 is compressed according to the pressure gradient between the two sub-spaces 7a, 7b. To this end, the spring characteristic of the respective valve spring 22 is preferably chosen such that the valve body 15 as a function of the piston velocity v assumes the switch position (overload position, constriction position, open position) which in each case corresponds to the respective pressure gradient present. The spring characteristic of the respective valve spring 22 here is in particular chosen such that, as a function of the piston velocity v, the portion of the valve body 15 that corresponds to the respective switch state to be adjusted (overload state, constriction state, open state) lies opposite the mating part 18, thus in the overload state, for example, the chamfered material portion 20, in the constriction state the groove portion 17b, and in the open state the groove portion 17a.

Claimed according to a further teaching which is of independent relevance, is a drive assembly 1 for a hatch 2, in particular a rear hatch, of a motor vehicle, optionally having at least one motorized drive 3, but at least having at least one gas pressure element 4, in particular having a gas spring, wherein the gas pressure element 4 has an externally sealed cylinder 6 and a piston 8 which in the cylinder interior space 7 runs along the cylinder axis A and subdivides the cylinder interior space 7 into two sub-spaces 7a, 7b, wherein the gas pressure element 4 has a first drive connector 4a which is connected to the cylinder 6, and a second drive connector 4b which is connected to the piston 8, wherein the cylinder 6 is filled with an in particular pressurized fluid, wherein the piston 8 has an overflow duct assembly 9 by way of which, in response to a piston movement, for balancing a pressure gradient between the two sub-spaces 7a, 7b a balancing flow between the two sub-spaces 7a, 7b is created, and wherein the piston 8 is assigned a switchable valve assembly 10 which, as a function of the pressure gradient between the two sub-spaces 7a, 7b can be brought to different through flow states which differ in terms of the size of the cross section which can be flowed through of the overflow duct assembly 9. Reference may be made to all explanations pertaining to the drive assembly 1 according to the proposal and according to the first teaching.

According to this teaching, it is provided in particular when the two drive connectors are converged, that the valve assembly 10 when exceeding a predetermined lower limit value for the pressure gradient switches in a self-acting manner from an open state to a constriction state in which said valve assembly 10 decreases the cross section of the overflow duct assembly 9 in relation to the open state, and when exceeding a predetermined upper limit value for the pressure gradient switches in a self-acting manner from the constriction state to a closing state in which said valve assembly 10 decreases the cross section of the overflow duct assembly 9 in relation to the constriction state.

The cross section of the overflow duct assembly 9, upon exceeding the predetermined upper limit value for the pressure gradient, is preferably at least predominantly, preferably completely closed, and thus no longer able to be passed through by a flow, at least not to a noteworthy extent.

Claimed according to a further teaching which is likewise of independent relevance is a hatch assembly 5 having a hatch 2, in particular a rear hatch, and having a drive assembly 1 according to the proposal, which is assigned to the hatch 2. Reference may be made to all explanations pertaining to the drive assembly 1 according to the proposal and according to the first teaching and according to the second teaching.

This is in particular a hatch 2 which is pivotable about a pivot axis X and in the assembled state is aligned so as to be substantially horizontal. As has been explained above, the drive assembly 1 according to the proposal can be used in a particularly advantageous manner precisely in this specific application. This applies in particular to a case as has been explained above, in which the speed of the hatch 2 has in particular been increased. In the hatch assembly 5 according to the proposal such a case is in particular defined in that the driving force and/or holding force of the drive 3 fails and the hatch 2 as a result is urged in the closing direction or in the opening direction due to the spring force and/or due to gravity, or in that a user manually closes the hatch, wherein the required switching of the valve assembly 10 to the constriction state, as is provided according to the first and the second teaching, and optionally to the closing state, as is provided according to the second teaching, counteracts any further adjustment of the hatch 2 and in particular blocks any further adjustment of the hatch 2.

The invention claimed is:

1. A drive assembly for a use in hatch of a motor vehicle, the drive assembly comprising:
    at least one gas pressure element including an externally sealed cylinder and a piston, the piston disposed in an interior space of the cylinder and configured to move along a cylinder axis of the cylinder and sub-dividing the cylinder interior space into two sub-spaces,
    the gas pressure element including a first drive connector, connected to the cylinder, and a second drive connector connected to the piston, the cylinder filled with a gas, the piston including an overflow duct assembly, the overflow duct assembly configured to, responsive to movement of the piston, provide a balancing flow of a portion of the gas between the two sub-spaces to balance a pressure gradient between the two sub-spaces,
    the piston configured to cooperate with a switchable valve assembly, the switchable valve assembly configured to switch between different through-flow states as a function of the pressure gradient, a cross section of the overflow duct assembly differs in size between the different through-flow states,
    the valve assembly configured to switch, in a self-actuating manner, starting from a resting state of the gas pressure element, wherein no pressure gradient at all is present, to an overload through-flow state, in which the valve assembly enlarges the cross-section of the overflow duct assembly to a first cross section, in response to the gas acting on the valve assembly and the pressure gradient exceeding a predetermined upper limit value, and
    wherein the valve assembly is further configured to switch, in a self-acting manner, starting from the resting state of the gas pressure element, wherein no pressure gradient at all then is present, to a constriction state, in which the valve assembly reduces the cross-section of the overflow duct assembly to a second cross section, in response to the gas acting the valve assembly and the pressure gradient exceeding a predetermined lower limit value.

2. The drive assembly of claim 1, wherein the lower limit value corresponds to a first piston velocity ranging between 15 mm/s and 100 mm/s or the upper limit value corresponds to a second piston velocity ranging between 25 mm/s and 120 mm/s.

3. The drive assembly of claim 2, wherein during normal operation of the gas pressure element, the valve assembly is in an open state in which the overflow duct assembly has a third cross section, the third cross section larger than the second cross section and smaller than the first cross section.

4. The drive assembly of claim 3, wherein the valve assembly is configured to switch, in a self-acting manner, between the overload state and the constriction state so that the pressure gradient either falls below the predetermined upper limit value or the predetermined lower limit value.

5. The drive assembly of claim 4, wherein the gas pressure element includes a drive spring assembly provided with at least one coil spring, arranged coaxial to the cylinder.

6. The drive assembly of claim 5, wherein the valve assembly is configured to responsive to the two drive connectors converging, reduce the pressure gradient until the pressure gradient falls below predetermined upper limit value by switching, in a self-acting manner, to the constriction state.

7. The drive assembly of claim 6, wherein the drive spring assembly is configured such that a spring force of the at least one coil spring increases as distance between the two drive connectors decreases.

8. The drive assembly of claim 7, wherein the piston includes a piston rod and a main body fastened to the piston rod, the valve assembly includes a valve body configured to move relative to the main body, and wherein the overflow duct assembly is disposed between the main body and the valve body.

9. The drive assembly of claim 8, wherein the valve body is adjustable with respect to the main body of the piston between a plurality of switch positions, the plurality of switch positions including at least one open position, in which the valve assembly changes to the open state, at least one constriction position, in which the valve assembly changes to the constriction state, or at least one overload position in which the valve assembly changes to the overload state.

10. The drive assembly of claim 9, wherein the overflow duct assembly includes a number of gas ducts for fluidic connection between the two sub-spaces and extending between the main body and the valve body, wherein a first duct of the number of gas ducts is configured to form a bottleneck provided with a cross section that is smaller than cross sections of other portions of the first duct, wherein the balancing flow passes through at least a portion of the bottleneck based on the switch position of the valve body with respect to the main body of the piston.

11. The drive assembly of claim 10, wherein the valve body defines one groove for each gas duct, and in at least one of the open position, the constriction position, and the overload position, the bottleneck of the gas duct is formed by an annular space disposed between the valve body and a mating part.

12. The drive assembly of claim 11, wherein the groove has a first groove portion and a second groove portion, the first groove portion provided with at least one of a cross section, a depth, and a width that is larger than the second groove portion, and adjoining thereto the second groove portion having a smaller cross section and/or a smaller depth and/or width.

13. The drive assembly of claim 12, wherein the valve body includes at least one valve spring, wherein in at least one of the constriction position and the overload position, the at least one valve spring is impinged with a force in relation to the main body.

14. The drive assembly of claim 5, wherein the cylinder radially surrounds the at least one coil spring.

15. The drive assembly of claim 14, wherein the at least one coil spring includes a second coil spring, the second coil spring radially enclosed by the cylinder.

16. The drive assembly of claim 11, wherein
in the main body one groove is configured for each gas duct, and wherein the bottleneck of the gas duct in at least one of the constriction position and/or open position, is formed in each case between a groove portion of the groove and a mating part on the valve body, and/or wherein the overload position, the bottleneck of the gas duct is an annular space between the main body and a mating part on the valve body.

17. A drive assembly for use in a hatch of a motor vehicle, the drive assembly comprising:
at least one gas pressure element including an externally sealed cylinder and a piston, the piston disposed in an interior space of the cylinder, configured to move along a cylinder axis defined by the cylinder, configured to sub-divide the interior space into two sub-spaces, the gas pressure element including a first drive connector, connected to the cylinder, and a second drive connector connected to the piston, wherein the cylinder is filled with a pressurized gas, the piston provided with an overflow duct assembly, the overflow duct assembly configured to, responsive to movement of the piston, provide a balancing flow between the two sub-spaces to balance a pressure gradient between the two sub-spaces, and the piston configured to cooperate with a switchable valve assembly, the switchable valve assembly configured to switch between different through-flow states as a function of the pressure gradient, each of the different through-flow states corresponding to different sizes of a cross section of the overflow duct assembly, the valve assembly configured to, responsive to the pressure gradient exceeding a predetermined lower limit value, starting from a resting state of the gas pressure element, wherein no pressure gradient at all is present, switch in a self-acting manner from an open state to a constriction state, in which the valve assembly reduces the cross section of the overflow duct assembly in relation to the open state, and wherein the valve assembly is further configured to, responsive to the pressure gradient exceeding a predetermined upper limit value, starting from a resting state of the gas pressure element, wherein no pressure gradient at all is present, switch in a self-acting manner from the constriction state to a closed state, in which the valve assembly decreases the cross section of the overflow duct assembly in relation to the constriction state.

18. A hatch assembly comprising:
a hatch; and
the drive assembly of claim 17.

* * * * *